(12) United States Patent
Panse

(10) Patent No.: US 7,259,115 B2
(45) Date of Patent: Aug. 21, 2007

(54) CURABLE EXTRUDED ADHESIVE LAMINATE SYSTEM FOR MANUFACTURING COLLAPSIBLE STRUCTURES

(75) Inventor: Dattatreya Ramesh Panse, Warwick, RI (US)

(73) Assignee: Cooley, Incorporated, Pawtucket, RI (US)

( * ) Notice: Subject to any disclaimer, the term of this patent is extended or adjusted under 35 U.S.C. 154(b) by 206 days.

(21) Appl. No.: 10/723,145

(22) Filed: Nov. 26, 2003

(65) Prior Publication Data

US 2005/0112971 A1 May 26, 2005

(51) Int. Cl.
*B32B 27/12* (2006.01)
*B32B 29/02* (2006.01)
*B32B 5/02* (2006.01)

(52) U.S. Cl. .......................... 442/66; 442/62; 442/149
(58) Field of Classification Search ................ 428/160, 428/422.8, 438; 442/62, 66, 149
See application file for complete search history.

(56) References Cited

U.S. PATENT DOCUMENTS

| | | | |
|---|---|---|---|
| 3,528,948 A | 9/1970 | Reuter | |
| 3,706,710 A | 12/1972 | Camilleri et al. | |
| 4,487,913 A | 12/1984 | Chung | |
| 4,565,729 A | 1/1986 | Liggett et al. | |
| 4,567,090 A * | 1/1986 | Ohya et al. | 428/214 |
| 5,047,495 A | 9/1991 | Kolycheck | |
| 6,309,507 B1 * | 10/2001 | Morikawa et al. | 156/331.4 |
| 6,526,859 B1 | 3/2003 | Ozawa et al. | |
| 6,596,819 B2 | 7/2003 | Morikawa et al. | |
| 2002/0032275 A1 | 3/2002 | Falcone et al. | |
| 2004/0058603 A1 * | 3/2004 | Hayes | 442/286 |

FOREIGN PATENT DOCUMENTS

JP    406192206 A  *  7/1994

OTHER PUBLICATIONS

D.C. Allport and W.H. Janes, Block Copolymers, Applied Science Publishers, Ltd.
Andreas Wenning Jurn-Volker Weib Werner Grenda, Polyisocyanates Today and Tomorrow.

* cited by examiner

Primary Examiner—Lynda Salvatore
(74) Attorney, Agent, or Firm—Lowrie, Lando & Anastasi, LLP

(57) ABSTRACT

The invention is a heat curable extruded adhesive laminate system for producing collapsible tanks. The laminate is a composite of a fabric; an extruded linear hydroxyl adhesive having an uretdione that serves as a latent thermally activated curing component, and a high cyrstallinity thermoplastic polyurethane. In the system, panels cut from the adhesive laminate are assembled and seamed in a compression press operating at about 260° F. to about 350° F. The bonding process takes about 20-45 minutes, which causes the latent thermally activated curing component to cure the adhesive. Following compression heating in the press, the resulting seams have a strength that exceeds the minimum acceptable performance of 25 lbs/in, after being immersed in water and/or fuel at 160° F. for six weeks.

31 Claims, No Drawings

CURABLE EXTRUDED ADHESIVE LAMINATE SYSTEM FOR MANUFACTURING COLLAPSIBLE STRUCTURES

BACKGROUND

1. Field of the Invention

The invention relates generally to flexible laminates and more particularly to extruded thermoplastic adhesive laminates, wherein the laminate is particularly suitable for forming collapsible structures such as fuel tanks, water tanks, inflatable boats and other solid/liquid storage tanks.

2. Prior Art

Traditionally, collapsible tanks are constructed of panels that are assembled into the desired shape either by compression press or hot-air heating and pressure or RF welding. Flexible laminates are made by applying a solvent based adhesive on a nylon or polyester or Kevlar fabric, which is then extrusion coated with a thermoplastic polyurethane (TPU) or a TPU alloy onto the adhesive side of the coated fabric. In the current art the solvent based adhesive typically has a curing additive which cross-links the adhesive, thereby securely anchoring the extruded TPU to the fabric. It is recognized that the collapsible structures can undergo rather severe oxidative and hydrolytic conditions. As an example, in a water tank, the water tank can be exposed to the external weather elements for an indefinite, and potentially extended, period of time. Also, the collapsible structures used as fuel tanks need to be resistant to the solvating effects of fuel and, therefore, must be virtually impervious and non-swelling in the presence of the fuel. In both cases a relatively high-degree of cross-linking is desired to minimize the deleterious effects of fuel, oxygen, and water. To a certain extent the TPU is selected so that it is inherently resistant to aging, hydrolysis, oxidation and swelling. Typically, the adhesive laminate, as well as the assembled tank or other collapsible structure needs to retain bond strength and seam strength under severe conditions. The minimum acceptable bond performance is 25 lbs/in, following immersion in water and/or fuel at 160° F. for six weeks.

While conventional solvent based adhesives meet the performance requirements for collapsible structures there are various process-related problems. The major concern is the generation of air-borne emissions, typically as defined by the EPA as VOCs (e.g. volatile organic compounds). Normally, VOCs are captured by solvent recovery systems, or are disintegrated using catalytic converters (a.k.a. thermal oxidizer). Solvents have the additional problem that in addition to their cost of use and cost of capture they are flammable, and therefore represent an on-going threat of fire. What is desired is a laminating adhesive suitable for collapsible structures that does not utilize a solvent-based adhesive.

SUMMARY OF THE INVENTION

The invention is a heat-curable extruded adhesive laminate system for producing collapsible tanks. The system is comprised of a fabric, onto which is coated an extruded adhesive having a latent thermally activated curing component; and then onto which is coated a thermoplastic resin. The thermoplastic resin is extruded on top of the extruded adhesive. Alternatively, the thermoplastic resin and adhesive can be co-extruded onto the fabric. The adhesive can also be applied with a slot die or hot melt coating equipment. The thermally activated curing component remains latent until the laminate system is elevated to a temperature that is sufficiently high to actuate the curing component. Examples of latent thermally activated curing components are blocked isocyanates, which are isocyanates that are reversibly reacted with ketoximes, hydroxylic compounds such as 1,2,4-triazole, 3,5-dimethylpyrazole, and cycloimides, such as epsilon-caprolactam. Another type of blocked isocyanate are those characterized as internally blocked isocyanates. They are substantially dimers of diisocyanates. The dimers, as a class, are known as uretdiones. Some commercial grades include multi-uretdione adducts, as well as pure dimers, or a combination thereof. Uretdione diisocyanates are selected from the group consisting of TDI, MDI, XDI, IPDI, $H_{12}$MDI and HMDI. The aliphatic and cycloaliphatic diisocyanates are particularly suited for the invention in that they have superior weathering. An example of an aliphatic diisocyanate is hexamethylene diisocyanate (HMDI), and prototypical of cycloaliphatic diisocyanates are isophorone diisocyanate (IPDI) and hydrogenated HMDI, also known as dicyclohexalmethene 4,4'-diisocyanate ($H_{12}$MDI). Uretdiones, upon heating, disassociate to form the monomers at temperatures normally used to assemble panels of the heat-curable extrudable adhesive laminate. Seaming bonds of panels are typically formed in a compression press at temperatures from about 260° F. to about 350° F., wherein the combination of heat and pressure cause the thermoplastic resins and adhesive to fuse and cure. Typical press times are on the order of 20 to 45 minutes. It is recognized that higher temperatures can be employed; however, potentially with disadvantageous side reactions. Preferably, the thermally activated curing component additionally comprises a cross-linking enhancer which is commonly a multi-functional hydroxyl compound. Examples of cross-linking enhancers are hydroxyalkyamides (i.e. N,N,N',N'-tetrakis(2-hydroxyethyl)adipamide, or N,N,N',N'-tetrakis(2-hydroxypropyl) adipamide); triglycidyl isocyanurate, pentaerythritols; mono, di and tri alkanol amines; glycols; abitol; butylene glycol; cyclohexandeminethanol; dipentaerythritol; dipropylene glycol; glycerine; hexylene glycol; hydrogenated Bisphenol A; methyl 1,2 propanediol; neopentylglycol; propylene glycol; sorbitol; triethylene glycol; trimethylolpropane; tripentaerythritol; alkoxy and hydroxyl alkoxy cellulose, simple sugars like fructose, sucrose, glucose and starches. Note, in the case of some multi-functional hydroxy compounds there is an amine group that is a component of the compound. Amines are catalysts that accelerate the isocyanate reaction with a hydroxy functional group therein forming a urethane. It is anticipated that the heat curable extruded adhesive laminate system can be compounded to include urethane catalysts and accelerants, such as sterically hindered amines (i.e. DABCO® registered trademark of Air Products) and metal catalysts. Examples of two commonly employed tin catalysts are stannous octoate and dibutyl tin dilaurate. Goldschmidt Industrial Chemical Corporation offers a more complete list of metal catalyst. The preferred thermoplastic resin is a thermoplastic polyurethane (TPU) or a TPU alloy that has a low to medium level of crystallinity. Likewise, the extruded adhesive is a thermoplastic polyurethane with a medium to high degree of crystallinity. The extrudable adhesive is a hydroxyl thermoplastic urethane with pendent hydroxyl groups with which the latent thermally activated curing component can react, thereby cross-linking (in effect polymerizing) the adhesive. Following curing, the cross-linked adhesive is resistant to heat and to solvents. The heat curable extruded adhesive laminate can then be cut into panels for fabrication into collapsible tanks and the like. The heat curable extruded adhesive laminate system further comprises the fabrication of the panels into collapsible tanks, such as water tanks and fuel tanks and puncture resistant fabrics having good weathering properties. These fabrics are sometimes referred to as ballistic fabrics, depending on their level of puncture resistance. An example of an application for ballistic fabrics is in the fabrication of inflatable boats.

Alternatively, the extruded adhesive with the thermally activated curing component can be admixed with the thermoplastic resin, and the entire composition can be extruded as a one pass coating onto the fabric. We have found that the effectiveness of the admixture is reduced; however, for certain less critical applications, where cost is a major consideration, a one pass process can be employed with varying levels of success. As the case with the two pass process and the co-extruded process, in a one pass heat curable extruded adhesive laminate system, the curing component is latent during extrusion, and is initiated when the laminate is exposed to the higher temperatures and longer elevated temperature times used during the fabrication of the collapsible structures.

Irregardless of whether a one pass, a two pass or a co-extruded process system is employed, the thermoplastic resin and/or the extruded adhesive can be compounded with additional additives, such as reinforcing fibers, extenders which are fillers, antioxidants, UV stabilizers, thermo-stabilizers, flame retardants, glass beads, colorants, anti-microbial agents, dyes, pigments, processing aids (i.e. waxes, fluorinated compounds, silicone compounds, surfactants, polymeric processing aides), density modifiers such as phenolic beads, desiccants, buffers, and IR absorbent compounds to facilitate heating. Examples of IR absorbent compounds are carbon blacks, graphite, and metal oxides, which can be added in such levels as to be virtually non-coloring, yet absorbent to infrared radiation, which enables the laminate to be rapidly deep heated.

Depending on the structural requirements for the collapsible tank, the fabric is selected to be sufficiently strong to handle the tensile requirements imposed by the weight of the contents of the tank. The invention is not limited to merely free standing tanks and inflated tanks. The collapsible tank can be supported by a frame or a palletized container.

DETAILED DESCRIPTION

The invention is a heat curable extruded adhesive laminate system for producing collapsible tanks. Examples of collapsible structures include fuel tanks, water tanks, inflatable boats and other solid/liquid storage tanks. Polyurethanes are preferred because of their flexibility, their inertness, and in the case of water tanks they can be synthesized so that there are very few residual materials that impart taste, and they can be selected to have good hydrolytic stability. In the invention, the laminate is a composite of a fabric, a heat curable extruded adhesive, and a thermoplastic polyurethane (or TPU) or TPU alloys. Typically, the fabric is selected from Nylon or polyester, albeit other materials are suitable. In the case of inflatable boats, ballistic cloth is normally used, and ballistic cloth usually incorporates polyimides (e.g. Kevlar® by Dupont) or Nylon or ultra high molecular weight polyethylene (UHMW polyethylene). The fabric can also be a blend of organic and/or inorganic fibers (i.e. fiber glass). Nominally, the tanks are constructed by assembling panels of the extruded adhesive laminate into the desired shape. Compression press or hot-air or RF welding are the preferred techniques for seaming. The latent cure in the extruded adhesive is activated causing the extruded adhesive to be cured during the assembly operation. The preferred adhesive is a thermoplastic polyurethane containing reactive hydroxyl functional groups. The thermoplastic polyurethane has medium to high crystallinity. Examples of suitable elastomeric polyurethane adhesives are Bayer's Desmolmelt 540 and Desmolmelt 530. Desmolmelt 540 is a linear hydroxyl polyurethane, where the polyurethane is of the polyester type. The hydroxyl content is less than 1%. The activation temperature is approximately 60° C. It is described as having a very high crystallinity and very low thermoplasticity. Desmolmelt 530 has a slightly lower activation temperature, approximately 55° C., slightly lower crystallinity and slightly lower molecular weight. The adhesive is compounded with a latent isocyanate based cross-linker, a hydrolytic stabilizer and a cross-link enhancer. The isocyanate is internally blocked, preferably the uretdione type, which activates at temperatures in excess of 300° F. Uretdiones of IPDI are particularly suitable, as they are cycloaliphatic, and therefore are relatively non-yellowing. Commercial grades of uretdiones, which are poly-uretdiones of IPDI are CRELAN VP LS 2347, VESTAGON EP-BF-1320, VESTAGON BF 1540. VESTAGON® BF 1540 is a Degussa product. It is uretdione-poly adduct having an NCO content of 15.2-17.0% wt. VESTAGON EP-BF-1320 is also a uretdione-poly adduct, having an NCO content 13.0-14.5% wt. VESTAGON EP-BF-1320 has a higher functionality than BF 1540. It is supplied as a coarsely ground powder. CRELAN® VP LS 2347 and CRELAN® VP LS 2147 are Bayer uretdione "hardeners". The adhesive is further compounded with a cross-link enhancer, such as hydroxyalkylamide. Examples of a hydroxyalkylamide include N,N,N',N'-tetrakis(2-hydroxyethyl)adipamide, which is commercially sold under the brand name Primid XL-552, and N,N,N',N'-tetrakis(2-hydroxypropyl)adipamide, which is commercially sold under the name of Primid QM-1260. Primid® is a trade name of Ems-Chemie Chemie AG, Switzerland. The disclosed hydroxyalkylamide has a functionality of four, and is very effective at increasing the cross-link density. The adhesive is further comprised of a hydrolytic stabilizer such as a carbodiimide. A suitable carbodiimide is bis(2,6-di-2-propylphenyl) carbodiimide, sold under the trade name of Stabaxol® of Bayer. Rhein Chemie sells various grades of bis(2,6-di-2-propylphenyl) carbodiimide, which facilitates mixing.

The preferred thermoplastic polyurethane is a high molecular weight polyester type thermoplastic TPU. Representative commercial grades that are suitable are ESTANE 58277, ESTANE 58226, ELASTOLLAN 695A15, PELLETHANE 2355, and DESMOPAN 285. ESTANE® is a registered trademark of Noveon, Inc., ELASTOLLAN® is a registered trademark of BASF Corporation, DESMOPAN is a registered trademark of BAYER Corporation and PELLETHANE® is a trademark of Dow. The preferred TPUs are polyester type polyurethanes having good hydrolytic stability, a Vicat softening point greater than 170° F., and a Shore A Durometer of greater than 88. The tensile is preferably greater than 5000 psi.

In preparing the adhesive, a twin screw extruder can be used to compound all the components and then form pellets. The pellets are then extruded as a thin film onto the appropriate fabric, and then the TPU is extruded on the adhesive film. An alternative method is to co-extrude the adhesive and TPU together onto the fabric. The extrusion temperature is adjusted so that minimum curing takes place inside the extruder. Extrusion laminates made in this fashion can be assembled using a compression press. The presses normally operate between 280-340° F. and 20-45 minutes dwell times. The elevated temperatures cause the TPU on the panel of the laminate to weld to the TPU on adjacent panels. During the assembly process, the uretdione activates and propagates the cross-linking reaction resulting in a long lasting, strong bond.

In the examples below are two examples of the adhesive formulation.

EXAMPLE 1

In a twin screw extruder are added 1500 wt. units of Desmomelt 540 (a linear hydroxyl polyurethane adhesive), 150 wt. units of Vestagon BF 1320 (uretdione internally blocked cross-linked) and 12 wt. units of Staboloxol P (carbodiimide—hydrolytic stabilizer). The components are mixed and pelletized.

EXAMPLE 2

In a twin screw extruder are added 1500 wt. units of Desmomelt 540 (a linear hydroxyl polyurethane adhesive), 150 wt. units of Vestagon BF 1320 (uretdione internally blocked cross-linked isocyanate), 12 wt. units of Staboloxol P (carbodiimide—hydrolytic stabilizer), and 50 wt. units of Primid (N,N,N',N'-tetrakis(2-hydroxyethyl)adipamide, a cross-link enhancer). The components are mixed and pelletized.

Prior to extruding the thermoplastic resin (TPU), the TPU is dried. The water content is preferably less than 0.03%. Masterbatches of fillers, colorants, and reinforcing additives are compounded as desired. Nominally, additional antioxidants, UV stabilizers and processing aides are not required. Coating weights are appropriately adjusted for the denier and count of the thread.

Following compression heating in the press, the resulting seams have a strength that exceed the minimum acceptable bond performance of 25 lbs/in, following immersion in water and/or fuel at 160° F. for six weeks.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A heat curable extruded adhesive laminate system, said system comprising:
   a fabric;
   an extruded adhesive having an activation temperature of approximately 55° C.-60° C. that is a thermoplastic polyurethane with pendent hydroxyl groups, said adhesive comprising a uretdione with an activation temperature in excess of 300° F. and a cross-linking enhancer, where said extruded adhesive is coated onto the fabric; and
   an extruded thermoplastic polyurethane resin having a Shore A Durometer greater than 88, said thermoplastic resin coated onto the extruded adhesive;
   wherein said laminate is a composite that at a subsequent time is assembled into a collapsible structure by application of heat and compression, said structure being hydrolytically stable and substantially inert following assembly; and
   wherein the cross-linking enhancer is a compound with at least two hydroxyl groups.

2. A heat curable extruded adhesive laminate system, according to claim 1, said system further comprising heating at least a portion of the composite to a temperature from about 260° F. to about 350° F. in a compression press.

3. The heat curable extruded adhesive laminate system, as claimed in claim 1, wherein said structure is a collapsible tank.

4. The heat curable extruded adhesive laminate system, as claimed in claim 1, wherein said thermoplastic polyurethane with pendent hydroxyl groups has a medium to a high level of crystallinity.

5. The heat curable extruded adhesive laminate system, as claimed in claim 1, wherein the uretdione is comprised of a dimer of a diisocyanate, a multi-uretdione adduct or a combination thereof.

6. The heat curable extruded adhesive laminate system, as claimed in claim 5, wherein the uretdione is selected from the group consisting of dimers of toluene diisocyanate (TDI), methylene diisocyanate (MDI), xylene diisocyanate (XDI), isophorone diisocyanate (IPDI), hydrogenated methylene diisocyanate ($H_{12}$MDI), and hexamethylene diisocyanate (HMDI).

7. The heat curable extruded adhesive laminate system, as claimed in claim 1, wherein the cross-linking enhancer is selected from the group consisting of: a hydroxyalkylamide; glycols; abitol; butylene glycol; cyclohexanedimethanol; diethylene glycol; dipentaerythritol; dipropylene glycol; glycerine; hexylene glycol; hydrogenated Bisphenol A; methyl 1,2 propanediol; neopentylglycol; propylene glycol; sorbitol; triethylene glycol; trimethylolpropane; tripentaerythritol, alkoxy and hydroxyl alkoxy cellulose, simple sugars like fructose, sucrose, glucose and starches.

8. A heat curable extruded adhesive laminate system, according to claim 1, wherein the extruded adhesive with a latent thermally activated curing component is further comprised of a hydrolytic stabilizer.

9. The heat curable extruded adhesive laminate system for producing collapsible tanks, as claimed in claim 8, wherein the hydrolytic stabilizer is selected from the group consisting of masterbatches of bis(2,6-di-2-propylphenyl) carbodiimide, polycarbodiimide and epoxidized soy bean oil.

10. The heat curable extruded adhesive laminate system, as claimed in claim 1, wherein the thermoplastic resin is compounded to include other additives such as reinforcing fibers, extenders, fillers, antioxidants, UV stabilizers, thermal stabilizers, flame retardants, glass beads, colorants, antimicrobial agents, dyes, pigments, processing aides (i.e. waxes, fluorinated compounds, silicone compounds, surfactants, polymeric processing aides), density modifiers such as phenolic beads, desiccants, buffers, and IR absorbent compounds to facilitate heating (i.e. carbon blacks, graphite, metal oxides).

11. The heat curable extruded adhesive laminate system, as claimed in claim 1, wherein the said extruded adhesive is further compounded to include other additives such as reinforcing fibers, extenders, antioxidants, UV stabilizers, thermal stabilizers, flame retardants, fillers, glass beads, colorants, antimicrobial agents, dyes, pigments, processing aides (i.e. waxes, fluorinated compounds, silicone compounds, surfactants, polymeric processing aides), density modifiers such as phenolic beads, desiccants, buffers, and IR absorbent compounds to facilitate heating (i.e. carbon blacks, graphite, metal oxides).

12. A one pass heat curable extruded adhesive laminate system, said system comprising:
   a fabric;

an extruded mixture comprised of a thermoplastic polyurethane resin having a Shore A Durometer greater than 88, a thermoplastic polyurethane adhesive having pendant hydroxyl groups, said adhesive having an activation temperature of approximately 55° C.-60° C. and comprising a uretdione with an activation temperature in excess of 300° F. and a cross-linking enhancer; wherein said extruded mixture is coated onto the fabric, thereby forming a one pass heat curable extruded adhesive laminate;

where said laminate is a composite that at a subsequent time is assembled into a collapsible structure by application of heat and compression, said structure being hydrolytically stable and substantially inert following assembly; and wherein the cross-linking enhancer is a compound with at least two hydroxyl groups.

13. A one pass heat curable extruded adhesive laminate system, according to claim 12, wherein said one pass system further comprising heating at least a portion of the composite to a temperature from about 260° F. to about 350° F. in a compression press.

14. The one pass heat curable extruded adhesive laminate system, as claimed in claim 12, wherein said structure is a collapsible tank.

15. The one pass heat curable extruded adhesive laminate system, as claimed in claim 12, wherein said thermoplastic polyurethane with pendant hydroxyl groups has a medium to a high level of crystallinity.

16. The one pass heat curable extruded adhesive laminate system, as claimed in claim 15, wherein the uretdione is comprised of a dimer of a diisocyanate, a multi-uretdione adduct or a combination thereof.

17. The one pass heat curable extruded adhesive laminate system, as claimed in claim 16, wherein the uretdione is selected from the group consisting of dimers of toluene diisocyanate (TDI), methylene diisocyanate (MDI), xylene diisocyanate (XDI), isophorone diisocyanate (IPDI), hydrogenated methylene diisocyanate ($H_{12}$MDI), and hexamethylene diisocyanate (HMDI).

18. The one pass heat curable extruded adhesive laminate system, as claimed in claim 12 wherein the cross-linking enhancer is selected from the group consisting of: a hydroxyalkylamide; glycols; abitol; butylene glycol; cyclohexanedimethanol; diethylene glycol; dipentaerythritol; dipropylene glycol; glycerine; hexylene glycol; hydrogenated Bisphenol A; methyl 1,2 propanediol; neopentylglycol; propylene glycol; sorbitol; triethylene glycol; trimethylolpropane; tnpentaerythritol, alkoxy and hydroxyl alkoxy cellulose, simple sugars like fructose, sucrose, glucose and starches.

19. A one pass heat curable extruded adhesive laminate system, according to claim 12, wherein the extruded mixture is further comprised of a hydrolytic stabilizer.

20. The one pass heat curable extruded adhesive laminate system, as claimed in claim 19, wherein the hydrolytic stabilizer is selected from the group consisting of masterbatches of bis(2,6-di-2-propylphenyl)carbodiimide, polycarbodiimide and epoxidized soy bean oil.

21. The one pass heat curable extruded adhesive laminate system, as claimed in claim 12, wherein the thermoplastic resin is compounded to include other additives such as reinforcing fibers, fillers, antioxidants, UV stabilizers, thermal stabilizers, flame retardants, glass beads, colorants, antimicrobial agents, dyes, pigments, processing aides (i.e. waxes, fluorinated compounds, silicone compounds, surfactants, polymeric processing aides), density modifiers such as phenolic beads, desiccants, buffers, and IR absorbent compounds to facilitate heating (i.e. carbon blacks, graphite, metal oxides).

22. The one pass heat curable extruded adhesive laminate system, as claimed in claim 12, wherein the said extruded mixture is further compounded to include other additives such as reinforcing fibers, fillers, antioxidants, UV stabilizers, thermal stabilizers, flame retardants, glass beads, colorants, antimicrobial agents, dyes, pigments, processing aides (i.e. waxes, fluorinated compounds, silicone compounds, surfactants, polymeric processing aides), density modifiers such as phenolic beads, desiccants, buffers, and IR absorbent compounds to facilitate heating (i.e. carbon blacks, graphite, metal oxides).

23. The heat curable extruded adhesive laminate system, as claimed in claim 7, wherein the hydroxyalkylamide is N,N,N',N'-tetrakis(2-hydroxyethyl) adipamide, or N,N,N',N'-tetrakis(2-hydroxypropyl)adipamide.

24. The heat curable extruded adhesive laminate system, as claimed in claim 23, wherein the hydroxyalkylamide is combined with triglycidyl isocyanurate.

25. The one pass heat curable extruded adhesive laminate system, as claimed in claim 18, wherein the hydroxyalkylamide is N,N,N',N'-tetrakis(2-hydroxyethyl) adipamide, or N,N,N',N'-tetrakis(2-hydroxypropyl)adipamide.

26. The one pass heat curable extruded adhesive laminate system, as claimed in claim 25, wherein the hydroxyalkylamide is combined with triglycidyl isocyanurate.

27. A heat curable co-extruded adhesive laminate system, said system comprising:

a fabric;

a co-extruded adhesive having an activation temperature of approximately 55° C.-60° C. that is a thermoplastic polyurethane with pendent hydroxyl groups, said adhesive comprising a uretdione with an activation temperature in excess of 300° F. and a cross-linking enhancer, where said extruded adhesive is coated onto the fabric;

a co-extruded thermoplastic polyurethane resin having a Shore A Durometer greater than 88, said thermoplastic polyurethane resin being co-extruded onto the co-extruded adhesive;

where said laminate is a composite that at a subsequent time is assembled into a collapsible structure by application of heat and compression, said structure being hydrolytically stable and substantially inert following assembly; and wherein the cross-linking enhancer is a compound with at least two hydroxyl groups.

28. A heat curable co-extruded adhesive laminate system, according to claim 27, wherein said co-extruded system further comprising heating at least a portion of the composite to a temperature from about 260° F. to about 350° F. in a compression press.

29. The heat curable co-extruded adhesive laminate system, as claimed in claim 27, wherein said structure has seams which have a strength that exceeds the minimum acceptable performance for a collapsible water tank, said strength being 25 lbs/in, after being immersed in water and or fuel at 160° F. for six weeks.

30. The heat curable adhesive laminate system, as claimed in claim 1, wherein said structure has seams which have a strength that exceeds the minimum acceptable performance for a collapsible water tank, said strength being 25 lbs/in, after being immersed in water and/or fuel at 160° F. for six weeks.

31. The one pass heat curable extruded adhesive laminate system, as claimed in claim 12, wherein said structure has seams which have a strength that exceeds the minimum acceptable performance for a collapsible water tank, said strength being 25 lbs/in, after being immersed in water and/or fuel at 160° F. for six weeks.

* * * * *

UNITED STATES PATENT AND TRADEMARK OFFICE
CERTIFICATE OF CORRECTION

PATENT NO. : 7,259,115 B2
APPLICATION NO. : 10/723145
DATED : August 21, 2007
INVENTOR(S) : Dattatreya Ramesh Panse It is certified that error appears in the above-identified patent and that said Letters Patent is hereby corrected as shown below:

In column 5, line 11, "1500" should read --2000--

In column 5, line 13, "150" should read --200--

In column 7, line 49, "tnpentaerythritol" should read --tripentaerythritol--

In column 8, lines 60 and 61, "and or" should read --and/or--

Signed and Sealed this

Sixth Day of November, 2007

JON W. DUDAS
*Director of the United States Patent and Trademark Office*